United States Patent Office

Re. 24,761

Reissued Jan. 5, 1960

24,761

COMPOSITION FOR THE PREPARATION OF SPONGE PRODUCTS OF BUTYL RUBBER

Heinz A. Pfisterer and David W. G. Hay, Sarnia, Ontario, Canada, assignors to Polymer Corporation Limited, Sarnia, Ontario, Canada, a corporation of Canada No Drawing. Original No. 2,833,731, dated May 6, 1958, Serial No. 449,275, August 11, 1954. Application for reissue June 9, 1959, Serial No. 819,196

Claims priority, application Canada July 23, 1954

2 Claims. (Cl. 260—2.5)

Matter enclosed in heavy brackets [ ] appears in the original patent but forms no part of this reissue specification; matter printed in italics indicates the additions made by reissue.

This invention relates generally to the production of sponge (i.e. cellular) products from butyl rubber. Butyl rubber is a distinctive term in the art being a generic name applied to vulcanizable elastic copolymers of an iso-olefin, usually isobutylene, and small amounts of a diolefin which is generally isoprene. In any event, the iso-olefin will normally have 4 to 8 carbon atoms in the straight aliphatic chain and the diolefin will normally have 4–14 carbon atoms in the straight aliphatic chain.

Sponge rubber products may be produced either from solid rubbers or from high solids latices. In the manufacture of sponge rubber from solids, a solid blowing or gassing agent is dispersed as uniformly as possible throughout the rubbery polymer along with fillers, pigments, vulcanizers, accelerators, anti-oxidants, retarders and other compounding ingredients. The blowing or gassing agents are primarily thermally decomposable to provide a gaseous material. The sponge products may be either of the closed cell or open cell types depending on the properties required in the product. The closed cell type is achieved by causing some degree of vulcanization before the material is allowed fully to expand and finishing vulcanization after expansion, while the open cell type is prepared by permitting the material to expand prior to vulcanization. The choice of blowing agents and other compounding ingredients will be influenced by the nature of the sponge required. Sodium bicarbonate, ammonium carbonate, ammonium nitrate and many amino compounds are common blowing agents. Fine particle size sodium bicarbonate has been widely used commercially, particularly for open cell sponge where uniform cell size and low density are not of primary importance. Fatty acids have been conventionally employed to promote the decomposition of the sodium bicarbonate.

Natural rubber and certain synthetic rubbers, particularly polymers of butadiene and styrene, have generally been employed in sponge products. Sponge products produced from such stocks do not possess good ozone resistance and, where that property is required to an appreciable degree, butyl rubber would be a logical choice. Butyl rubber is recognized for its exceptional ozone resistance and aging properties, yet, where these properties are required in sponge products, there has been limited if any use of this material. The art heretofore has been unable to produce acceptable butyl sponge. The application of conventional sponge compounding practices results in a sponge of poor deformation recovery due to cellular tack. Efforts to overcome this disadvantage have included the incorporation of blooming agents. The blooming agents are intended to migrate to the surfaces, including the internal surfaces, of the vulcanized rubber compound and render the surface less tacky. Sulphur, selenium, tellurium, paraffin waxes, fatty acid waxes and high boiling aromatic esters have been among the blooming agents recommended. The amount of such blooming agent employed deliberately exceeds the tolerance of the polymer for such material and blooming results. The incorporation of a paraffin oil facilitates its migration. While this is a logical approach to the problem, it has not resulted in a product enjoying any appreciable commercial acceptance. The blooming in many cases detracts from the appearance of the product and in any event does not result in a sponge of sufficient resilience to be acceptable for most purposes.

It is the object of the present invention to suggest a butyl rubber composition which eliminates or substantially reduces the aforementioned disadvantages.

According to the present invention, a combination for the preparation of sponge products comprises a butyl rubber polymer, a sulphonated petroleum product and talc. The talc used will normally be all of a particle size not coarser than 300 mesh, and the talc is preferably water-ground.

The combination of the sulphonated petroleum product and the talc is found to give to the final sponge product a surprising resiliency and excellent deformation recovery. The sulphonated petroleum product is preferably used in the form of the plasticizer composition marketed by R. T. Vanderbilt Co., Inc., under the name "Plastogen" and herein designated by that name. Plastogen is composed of 98% selected mineral oil (about $C_{12}$), 1.6% sulphonated petroleum product (naphthenic), and 0.4% n-butyl alcohol. In whatever form it is used, the sulphonated petroleum product is preferably incorporated in the proportion of 0.4–5.0% by weight of the polymer. The talc is preferably used in the proportion of 60–95% by weight of the polymer.

The preparation of the sponge products will normally be effected with the use of blowing agents, as described above, and it has been found that sodium bicarbonate is the most useful of the blowing agents tested with the present invention. Sodium bicarbonate is preferably used in the proportion of 5–20% by weight of the polymer. As will be fully realized by persons versed in the art, a number of other ingredients will be used with the present composition, such ingredients including fillers, pigments, vulcanizers, accelerators, anti-oxidants, retarders and other compounding ingredients. These latter, however, form no part of the present invention.

It has been found advantageous to use, in conjunction with Plastogen, the plasticiser composition marketed by R. T. Vanderbilt Co., Inc. under the name "Reogen" and herein designated by that name. Reogen is composed of 80% selected mineral oil ($C_{12}$), 15% sulphonated petroleum product (naphthenic) and 5% n-butyl alcohol. The Reogen gives additional plasticising effect. It is found definitely disadvantageous, however, to use naphthenic base oil, paraffinic base oil and ordinary process oil for the purpose of plasticising.

In the practice of the present invention we prefer to employ a butyl polymer in the Mooney viscosity range of 70–80 ML 8. Moreover, we prefer it to be a relatively fast curing polymer, i.e., substantially 1.6 mol percent unsaturation. Polymers possessing lower unsaturation may be used providing the compounding recipe and cure time are adjusted to allow for the lower rate of cure. Polymers of higher unsaturation may also be used, but lower ozone resistance may be encountered in such stocks. Polymers of higher or lower Mooney viscosity may also be employed, though the former may be difficult to process and the latter will tolerate less plasticizer. The following table is indicative of the components which have been successfully employed to prepare compositions according to the present invention and indicative of certain limited ranges of proportions which have been found especially useful. Parts are by weight per 100 parts of polymer.

TABLE I

| | Parts |
|---|---|
| Butyl polymer (70–80 ML 8, 1.6 mol. percent unsat.) | 100 |
| Colour | As desired |
| Reogen | 5–15 |
| ZnO | 5 |
| Stearic acid | 2 |
| Antioxidant | 2 |
| Titanium dioxide | 5–20 |
| $NaHCO_3$ (approx.) | 10 |
| Talc (300 mesh) | 70–90 |
| Plastogen | 40–65 |
| Sulphur | 2.0 |
| Mercaptobenzothiazole (as sold under the name Captax and hereinafter so designated) | 1.0 |
| Tetramethylthiuramdisulfide (as sold under the name of Tuads and hereinafter so designated) | 1.5 |
| Tellurium diethyldithiocarbamate (as sold under the name of Tellurac and hereinafter so designated) | 1.5 |

The following are examples of the recipes and methods employed in the preparation of sponge butyl rubber products:

Example I

| | Parts |
|---|---|
| Butyl polymer (70–80 ML 8, 1.6 mol. percent unsat.) | 100 |
| Colour | 2 |
| Reogen | 10 |
| ZnO | 5 |
| Stearic acid | 2 |
| Antioxidant | 2 |
| Titanium dioxide | 2 |
| $NaHCO_3$ | 10 |
| Talc (water ground 300 mesh) | 80 |
| Plastogen | 55 |
| Sulphur | 2 |
| Captax | 1 |
| Tuads | 1.5 |
| Tellurac | 1.5 |

These components were mixed in a Banbury and on an open mill in the conventional manner, the sulphur and curing aids being added on the mill. The compound was blown and vulcanized in a mold in the conventional manner at 307° F. for 30 minutes. The vulcanized product was a highly resilient sponge possessing deformation recovery comparable to sponge products prepared from natural rubber or butadiene-styrene polymers.

Example II

| | Parts |
|---|---|
| Butyl polymer (70–80 ML 8, 1.6 mol. percent unsat.) | 100 |
| Colour | 2 |
| Xylyl mercaptan | 0.35 |
| ZnO | 5 |
| Stearic acid | 2 |
| Antioxidant | 2 |
| Titanium dioxide | 10 |
| $NaHCO_3$ | 10 |
| Talc (water ground 300 mesh) | 80 |
| Plastogen | 55 |
| Sulphur | 2 |
| Captax | 1 |
| Tuads | 1.5 |
| Tellurac | 1.5 |

Compounding and vulcanization were carried out as for Example I. The vulcanized sponge product possessed excellent physical properties.

Examples III–X

Eight different compositions were prepared as described below and sponge products produced therefrom in accordance with conventional procedure. Each composition was based on the following general and conventional formulation, all parts being by weight:

| | Parts |
|---|---|
| Butyl polymer (70–80 ML 8, 1.6 mol. percent unsat.) | 100 |
| Zinc oxide | 5 |
| Stearic acid | 2 |
| Captax | 1 |
| Tuads | 1.5 |
| Tellurac | 1.5 |
| Sulphur | 2.0 |
| Titanium dioxide | 10.0 |
| Powdered organic colour | 6.0 |

To these basic ingredients there were added the further ingredients specified in Table II below for each of the eight compositions denoted by Examples III–X respectively. A sponge product was prepared from each composition according to conventional procedure and the resilience of the sponge produced is indicated in each case.

TABLE II

| Examples | III | IV | V | VI | VII | VIII | IX | X |
|---|---|---|---|---|---|---|---|---|
| 33⅓% Napthyl Beta Mercaptan | 1 | | | | | | | |
| 33⅓% Xylyl Mercaptan | | 1 | | | | | | |
| Reogen | 5 | | 10 | 10 | 10 | 10 | 10 | 10 |
| Plastogen | 55 | 55 | 55 | | | | 55 | 55 |
| Naphthenic Base Oil | | | | 50 | | | | |
| Process Oil | | | | | 50 | | | |
| Paraffinic Base Oil | | | | | | 50 | | |
| $NaHCO_3$ | 10 | 10 | 10 | 10 | 10 | 10 | 10 | 10 |
| Water-Ground Talc | 80 | 80 | 80 | 80 | 80 | 80 | | |
| Fine Soft Clay | | | | | | | 80 | |
| Fine $CaCO_3$ | | | | | | | | 80 |
| Sponge Resilience | very good | very good | very good | very poor | very poor | very poor | very poor | very poor |

The water ground talc was 325 mesh particle size as sold by Eastern Magnesia Talc Co., Burlington, Vermont, U.S.A.

Examples XI–XIV

Table III demonstrates that butyl polymers of lower Mooney viscosity and higher and lower mol. percent unsaturation may also be employed. All examples conformed to the basic general formulation specified for Examples III–X and all further incorporated:

| | |
|---|---|
| Reogen | 10 |
| Plastogen | 55 |
| Talc (300 mesh) | 80 |
| $NaHCO_3$ | 10 |

The only difference between the four compositions of these examples is the difference in the viscosity and mol. unsaturation of the polymer used as indicated in Table III. The resiliency of sponge products prepared from each composition is described.

TABLE III

| Example | Mooney Viscosity, ML 8 | Mol Percent Unsaturation | Resiliency |
|---|---|---|---|
| XI | 40–50 | 1.4 | very good. |
| XII | 40–50 | 1.8 | Do. |
| XIII | 70–80 | 1.6 | Do. |
| XIV | 40–50 | 2.25 | Do. |

Nytal talc of similar particle size has been used as a substitute for water-ground talc in some of the above examples and the results were definitely useful as compared with the results achieved from prior art methods. The results with nytal talc were not, however, as good as with water-ground talc.

We claim:

1. A composition for the preparation of sponge products, said composition comprising an elastic copolymer of a major amount of an isoolefin and a minor amount of a diolefin, 5–20% by weight of polymer of sodium bicarbonate, [0.5–5% by weight of polymer] *an amount* of a mixture of 98% selected mineral oil containing about 12 carbon atoms, 1.6% sulphonated naphthenic petroleum product and 0.4% n-butyl alcohol *sufficient to bring the proportion of sulphonated naphthenic petroleum product within the range of 0.4–5.0% by weight of polymer,* and 60–95% by weight of polymer of talc which is substantially all of a particle size not coarser than 300 mesh.

2. A composition for the preparation of sponge products, said composition comprising an elastic copolymer of a major amount of an isoolefin and a minor amount of a diolefin, 5–20% by weight of polymer of sodium bicarbonate, [0.5–5.0% by weight of polymer] *an amount* of a mixture of 98% selected mineral oil containing about 12 carbon atoms, 1.6% sulphonated naphthenic petroleum product and 0.4% n-butyl alcohol, plus a mixture of 80% selected mineral oil containing about 12 carbon atoms, 15% sulphonated naphthenic petroleum product and 5% n-butyl alcohol *sufficient to bring the total amount of sulphonated naphthenic petroleum product within the range of 0.4–5.0% by weight of polymer,* and 60–95% by weight of polymer of talc which is substantially all of a particle size not coarser than 300 mesh.

References Cited in the file of this patent or the original patent

UNITED STATES PATENTS

| | | |
|---|---|---|
| 2,394,616 | Knoth et al. | Feb. 12, 1946 |
| 2,510,808 | Frolich | June 6, 1950 |
| 2,621,161 | Kulp et al. | Dec. 9, 1952 |
| 2,707,707 | Schwarz | May 3, 1955 |

OTHER REFERENCES

The Vanderbilt Rubber Handbook, Ninth Edition (1948), R. T. Vanderbilt Co. (New York), page 370.